United States Patent
Chen

(10) Patent No.: US 8,753,781 B2
(45) Date of Patent: Jun. 17, 2014

(54) FUEL PROVISION SYSTEM

(76) Inventor: Wen-Lo Chen, Taipei (TW)

(*) Notice: Subject to any disclaimer, the term of this patent is extended or adjusted under 35 U.S.C. 154(b) by 497 days.

(21) Appl. No.: 13/113,096

(22) Filed: May 23, 2011

(65) Prior Publication Data

US 2012/0301802 A1    Nov. 29, 2012

(51) Int. Cl.
*H01M 8/06*    (2006.01)
*C25B 15/08*    (2006.01)

(52) U.S. Cl.
USPC ............................................. 429/422; 123/3

(58) Field of Classification Search
USPC ................. 429/422; 123/3; 204/238
See application file for complete search history.

(56) References Cited

U.S. PATENT DOCUMENTS

2010/0239924 A1*    9/2010    McElroy et al. .............. 429/423

* cited by examiner

*Primary Examiner* — Mark F Huff
*Assistant Examiner* — Monique Wills
(74) *Attorney, Agent, or Firm* — Leong C. Lei

(57) ABSTRACT

The fuel provision system uses hydrogen and oxygen from a hydrogen container and an oxygen container as energy source for a power unit to deliver work and for a fuel cell to produce electricity. In the mean time, the water resulted from the power unit and the fuel cell is stored in a water tank and then electrolyzed in an electrolytic tank to produce hydrogen and oxygen. The hydrogen and oxygen are separated by an exchange membrane and recycled to the hydrogen and oxygen containers. The power unit is one of combustion engine accompanied by a generator and a battery, a furnace or an industrial cutting/welding device with a fuel tank, and an electrothermal device. The water tank is capable of adjusting the volume of output water flow and overflowing excessive water.

3 Claims, 3 Drawing Sheets

FUEL PROVISION SYSTEM

TECHNICAL FIELD OF THE INVENTION

The present invention is generally related to alternative energy sources, and more particularly to a hydrogen and oxygen provision system for hybrid electric vehicles, furnaces, industrial cutting/welding devices, and electrothermal devices.

DESCRIPTION OF THE PRIOR ART

The exhaust from the conventional gasoline and diesel engines is a major source of pollutants causing the green house effect. The diesel engine would produce various liquid and solid pollutants, as well as gas pollutants such as CO, $SO_x$, $CO_2$, and HC. These gas pollutants deteriorate the ozone layer, induce acid rain, raise global temperature, and cause many other environmental problems. These pollutants could also be hazardous to human health. For example, the PAHs (polycyclic aromatic hydrocarbons) or metallic compounds in the pollutants could cause pathological changes to the lungs, windpipe, and respiratory tract. The damage to the human health from the pollutants of the gasoline engine, even though not as obvious as those from the diesel engine, still could not be ignored.

The automobile industry has been working out various solutions such as filtering the exhaust before it is released to the environment. Yet the consumption of fossil fuel is still a major issue. Therefore there are electrical, hybrid electric, and solar-powered vehicles. Due to the limitation of the battery technology in terms of the capacity, charging speed, and weight, the cost of these electrical, hybrid electric, and solar-powered vehicles are still too high to become mainstreamed.

Additionally, for furnaces and industrial cutting/welding devices, they are operated simply by consuming fuels and there is no recycling of the by-products from the burning of the fuels.

Similarly, ordinary electrothermal devices such as electrical heaters, ovens, etc., also simply convert the electrical energy into thermal energy. They can only consume but not produce energy.

SUMMARY OF THE INVENTION

Therefore, an objective of the present invention is to recycle the by-products from the various power units such as combustion engines for motor vehicles, furnaces, industrial cutting/welding devices, and electrothermal devices.

The present invention provides a fuel provision system which uses hydrogen and oxygen as energy source for the power unit to deliver work and for a fuel cell to produce electricity. In the mean time, the water resulted from the power unit and the fuel cell is then electrolyzed to recycle hydrogen and oxygen.

In a first embodiment, the fuel provision system contains the following: a hydrogen container for the storage and refill of hydrogen; an oxygen container for the storage and refill of oxygen; a first pressure adjustment device and a second pressure adjustment device, both connected to the hydrogen and oxygen containers for adjusting the pressure and flow of output hydrogen and oxygen from the hydrogen and oxygen containers; a combustion engine connected to the first pressure adjustment device to receive hydrogen and oxygen and powered by igniting received hydrogen and oxygen; a generator connected to and driven by the combustion engine to produce electricity; a battery connected to the generator for the storage of electricity produced by the generator; a fuel cell connected to the second pressure adjustment device to receive hydrogen and oxygen, and to produce electricity by chemical reaction; a water tank connected to the combustion engine and the fuel cell for the storage of water produced by the combustion engine and the fuel cell; an electrolytic tank connected to the water tank, the battery, and the fuel cell, electrolyzing water from the water tank by electricity from the battery or the fuel cell into hydrogen and oxygen; an exchange membrane connected to the electrolytic tank and the water tank, purifying and separating hydrogen and oxygen from the electrolytic tank, and recycling water back to the water tank; a first pressurizing device connected to the exchange membrane and the oxygen container so that separated oxygen is pressurized and stored in the oxygen container; and a second pressurizing device connected to the exchange membrane and the hydrogen container so that separated hydrogen is pressurized and stored in the hydrogen container.

In a second embodiment, the fuel provision system contains the following: a hydrogen container for the storage and refill of hydrogen; an oxygen container for the storage and refill of oxygen; a first pressure adjustment device and a second pressure adjustment device, both connected to the hydrogen and oxygen containers for adjusting the pressure and flow of output hydrogen and oxygen from the hydrogen and oxygen containers; a fuel tank connected to the first pressure adjustment device to receive hydrogen and oxygen; one of a furnace and an industrial cutting/welding device connected to the fuel tank and using the fuel tank's stored hydrogen and oxygen as fuel; a fuel cell connected to the second pressure adjustment device to receive hydrogen and oxygen, and to produce electricity by chemical reaction; a water tank connected to the fuel cell for the storage of water produced by the fuel cell; an electrolytic tank connected to the water tank and the fuel cell, electrolyzing water from the water tank by electricity from the fuel cell into hydrogen and oxygen; an exchange membrane connected to the electrolytic tank and the water tank, purifying and separating hydrogen and oxygen from the electrolytic tank, and recycling water back to the water tank; a first pressurizing device connected to the exchange membrane and the oxygen container so that separated oxygen is pressurized and stored in the oxygen container; and a second pressurizing device connected to the exchange membrane and the hydrogen container so that separated hydrogen is pressurized and stored in the hydrogen container.

In a third embodiment, the fuel provision system contains the following: a hydrogen container for the storage and refill of hydrogen; an oxygen container for the storage and refill of oxygen; a pressure adjustment device connected to the hydrogen and oxygen containers for adjusting the pressure and flow of output hydrogen and oxygen from the hydrogen and oxygen containers; a fuel cell connected to the pressure adjustment device to receive hydrogen and oxygen, and to produce electricity by chemical reaction; an electrothermal device connected to the fuel cell and using electricity produced by the fuel cell as fuel; a water tank connected to the fuel cell for the storage of water produced by the fuel cell; an electrolytic tank connected to the water tank and the fuel cell, electrolyzing water from the water tank by electricity from the fuel cell into hydrogen and oxygen; an exchange membrane connected to the electrolytic tank and the water tank, purifying and separating hydrogen and oxygen from the electrolytic tank, and recycling water back to the water tank; a first pressurizing device connected to the exchange membrane and the oxygen container so that separated oxygen is pressurized and stored in the oxygen container; and a second pressurizing device connected to the exchange membrane and the hydrogen container so that separated hydrogen is pressurized and stored in the hydrogen container.

The water tank of the embodiments is capable of adjusting the volume of output water flow and overflowing excessive water.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
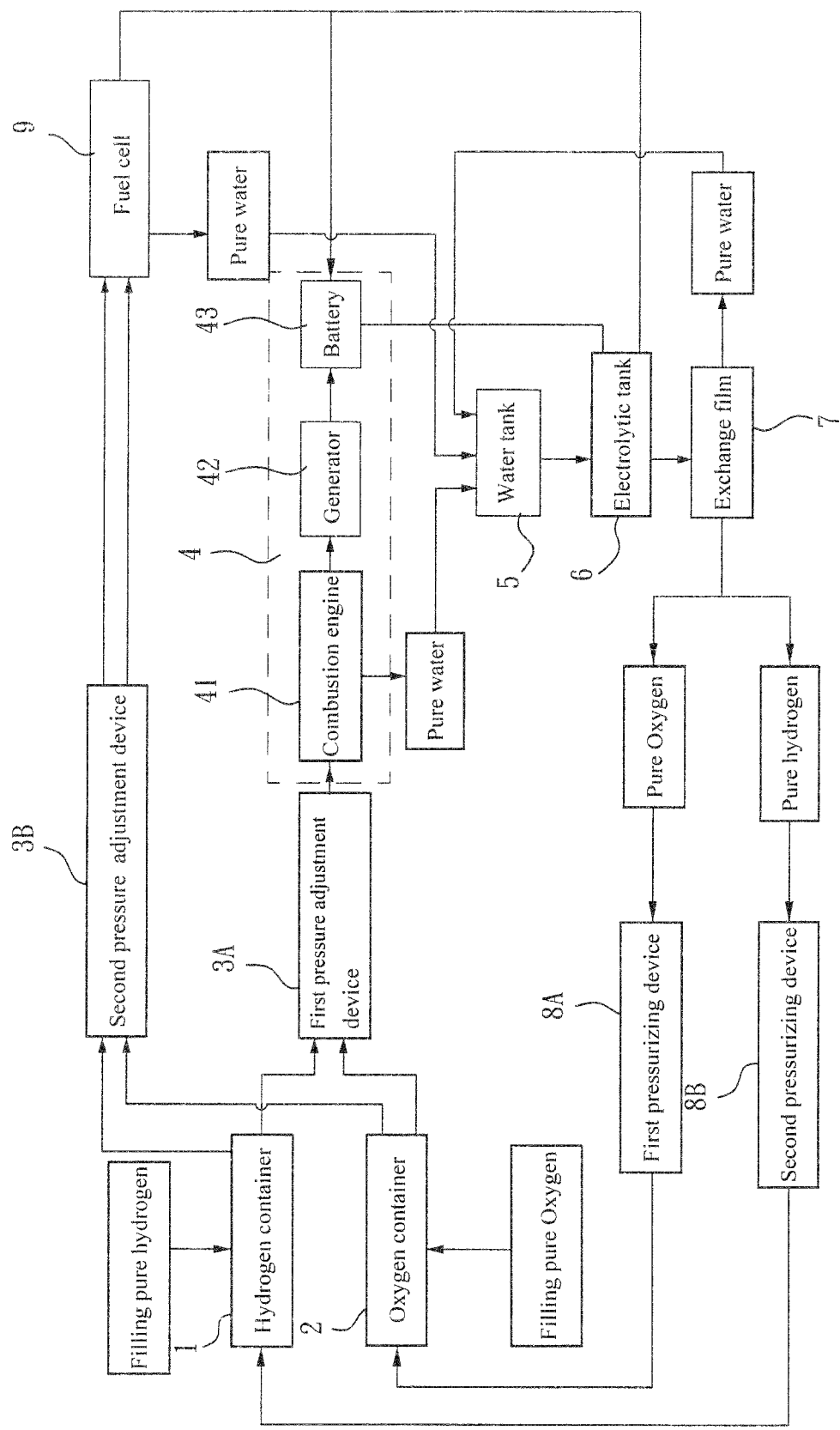
FIG. 1 shows a fuel provision system according to a first embodiment of the present invention.

FIG. 1 shows a the provision system according to a first embodiment of the present invention. As illustrated, there is a hydrogen container 1 and an oxygen container 2, both capable of holding high-pressure gases, for the storage and refill of hydrogen and oxygen, respectively. The hydrogen and oxygen containers 1 and 2 are piped into a first pressure adjustment device 3A so that the pressure and flow of output hydrogen and oxygen could be adjusted. The first pressure adjustment device 3A is then piped to a power unit 4 which contains a combustion engine 41, a generator 42, and a battery 43. More specifically, the hydrogen and oxygen are mixed at appropriate proportions and introduced into the combustion engine 41 by the pressure adjustment device 3A, where the mixed gases are ignited to drive the combustion engine 41. The power produced by the combustion engine 41 in turn drives the generator 42 to produce electricity which is stored in the battery 43. The hydrogen and oxygen containers 1 and 2 are also piped into a second pressure adjustment device 3B which in turn is connected to a fuel cell 9. In other words, the hydrogen and oxygen are mixed at appropriate proportions and introduced into the fuel cell 9 where electricity is produced by chemical reaction. In the present embodiment, there are also a water tank 5 and an electrolytic tank 6. The water tank 5 is piped to the combustion engine 41 and the fuel cells 9 for the storage of the water produced by the combustion engine 41 and the fuel cell 9. Additionally, the water tank 5 is capable of adjusting the volume of output water flow and overflowing excessive water. The electrolytic tank 6 is connected to the water tank 5, the battery 43, and the fuel cell 9. As such, by computer control, appropriate amount of water is introduced into the electrolytic tank 6 and, by the electricity from the battery 43 or the fuel cell 9, the water is electrolyzed into hydrogen and oxygen. The remaining water is recycled back to the water tank 5. On the other hand, the produced hydrogen and oxygen are directed through an exchange membrane 7 so that hydrogen and oxygen are purified and separately delivered to a first pressurizing device 8A and a second pressurizing device 8B. The hydrogen and oxygen are then stored in the hydrogen and oxygen containers 1 and 2 after being pressurized by the first and second pressurizing devices 8A and 8B, respectively.

The aforementioned combustion engine 41 could be one equipped in a motor vehicle and, as such, the combustion engine 41 is powered by hydrogen and oxygen while the generator 42 is also activated for electricity generation and the produced electricity is stored in the battery 43 for future usage. In the mean time, hydrogen and oxygen are delivered to the fuel cell 9 to conduct chemical reaction. Under computer control in accordance with the actual condition, the electricity from the battery 43 or fuel cell 9 is provided to the electrolytic tank 6 so that water from the power unit 4 and the fuel cell 9 is electrolyzed into hydrogen and oxygen. The fuel provision system as described therefore could be applied to a motor vehicle to turn the conventional fossil-fuel-based motor vehicle into a hybrid electric vehicle. The by-product of the fuel provision system (i.e., water) could be recycled to produce the hydrogen and oxygen for further power and electricity generation in a non-stop cyclic process. As such, the fuel provision system is a viable tool for environment protection.

Figure 2:
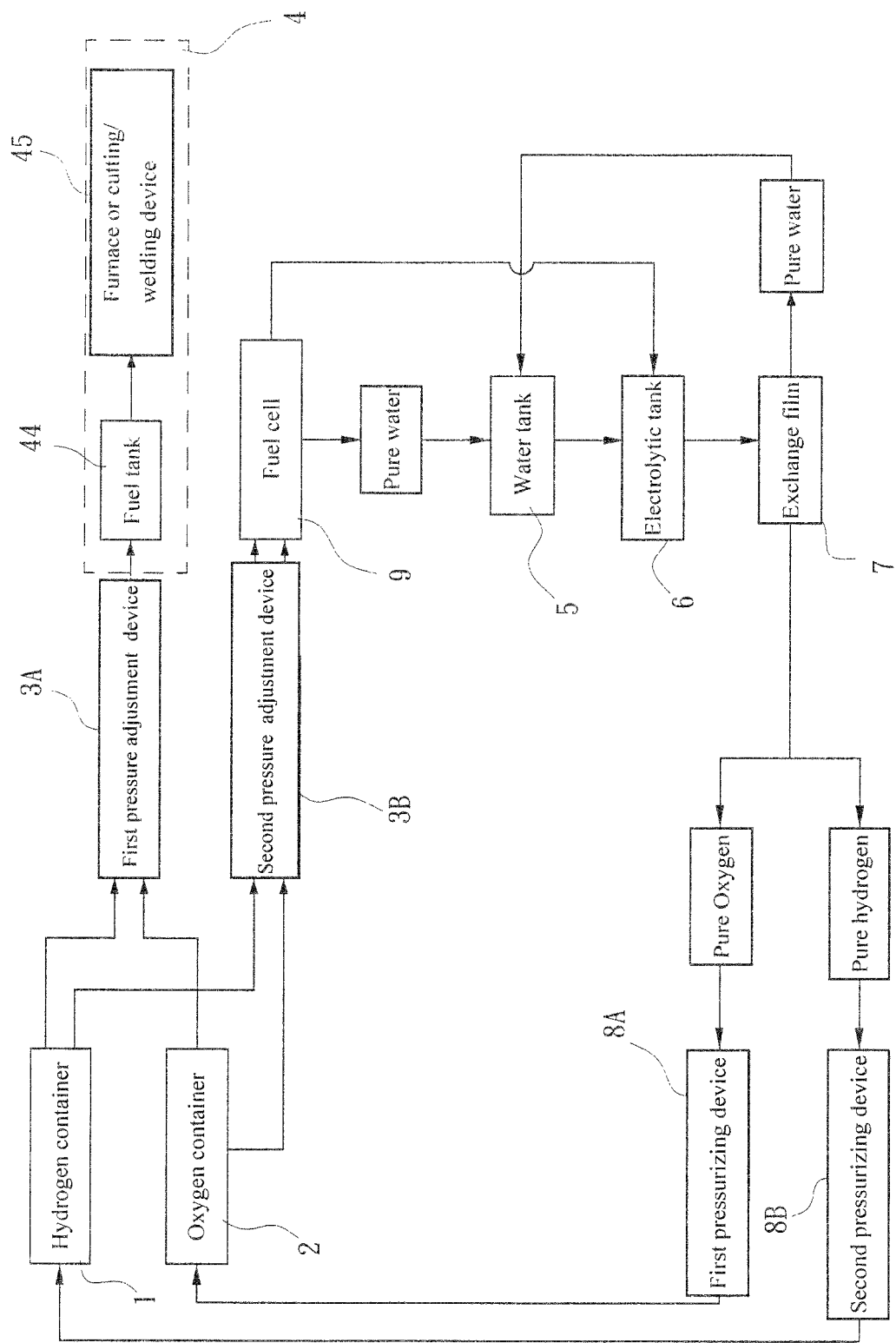
FIG. 2 shows a fuel provision system according to a second embodiment of the present invention.

FIG. 2 shows a fuel provision system according to a second embodiment of the present invention. As illustrated, there is a hydrogen container 1 and an oxygen container 2, both capable of holding high-pressure gases, for the storage and refill of hydrogen and oxygen, respectively. The hydrogen and oxygen containers 1 and 2 are piped into a first pressure adjustment device 3A so that the pressure and flow of output hydrogen and oxygen could be adjusted. The first pressure adjustment device 3A is then piped to a power unit 4 which contains a fuel tank 44 and a furnace or an industrial cutting/welding device 45. More specifically, the hydrogen and oxygen are mixed at appropriate proportions and introduced into the fuel tank 44 by the pressure adjustment device 3A. When the furnace or the cutting/welding device 45 is turned on, the mixed gases are supplied as fuel to the furnace or the cutting/welding device 45. The hydrogen and oxygen containers 1 and 2 are also piped into a second pressure adjustment device 3B which in turn is connected to a fuel cell 9. In other words, the hydrogen and oxygen are mixed at appropriate proportions and introduced into the fuel cell 9 where electricity is produced by chemical reaction. In the present embodiment, there are also a water tank 5 and an ectrolytic tank 6. The water tank 5 is piped to the fuel cell 9 for the storage of the water produced by the fuel cell 9. Additionally, the water tank 5 is capable of adjusting the volume of output water flow and overflowing excessive water. The electrolytic tank 6 is connected to the water tank 5 and the fuel cell 9. As such, by computer control, appropriate amount of water is introduced into the electrolytic tank 6 and, by the electricity from the fuel cell 9, the water is electrolyzed into hydrogen and oxygen.

The remaining water is recycled back to the water tank 5. On the other hand, the produced hydrogen and oxygen are directed through an exchange membrane 7 so that hydrogen and oxygen are purified and separately delivered to a first pressurizing device 8A and a second pressurizing device 8B. The hydrogen and oxygen are then stored in the hydrogen and oxygen containers 1 and 2 after being pressurized by the first and second pressurizing devices 8A and 8B, respectively.

Figure 3:
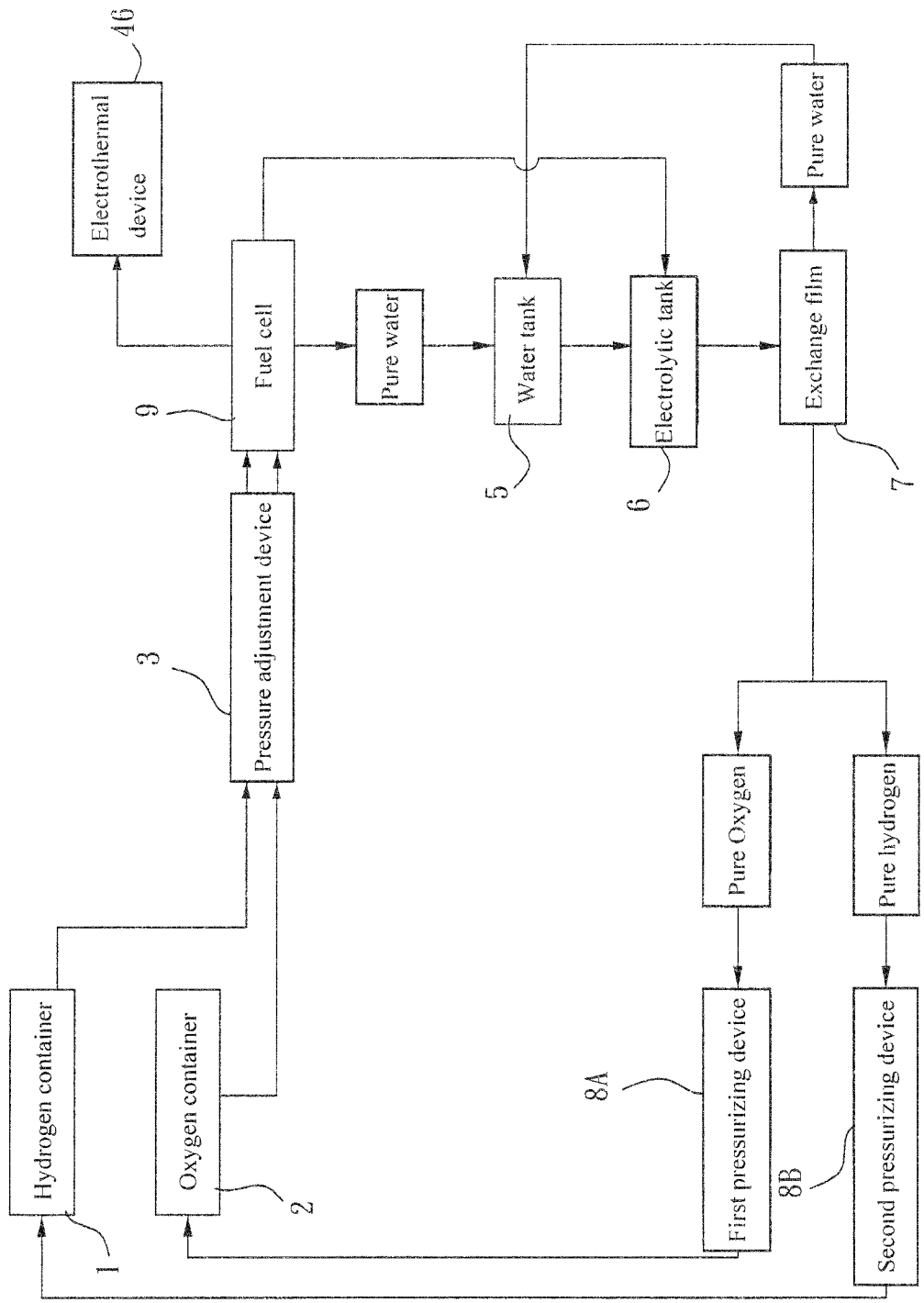
FIG. 3 shows a fuel provision system according to a third embodiment of the present invention.

FIG. 3 shows a fuel provision system according to a third embodiment of the present invention. As illustrated, there is a hydrogen container 1 and an oxygen container 2, both capable of holding high-pressure gases, for the storage and refill of hydrogen and oxygen, respectively. The hydrogen and oxygen containers 1 and 2 are piped into a pressure adjustment device 3 so that the pressure and flow of output hydrogen and oxygen could be adjusted. The pressure adjustment device 3 is then piped to a fuel cell 9 which in turn is connected to an electrothermal device 46. More specifically, the hydrogen and oxygen are mixed at appropriate proportions and introduced into the fuel cell 9 by the pressure adjustment device 3, where electricity is produced by chemical reaction. In the present embodiment, the electricity is directly supplied to power the electrothermal device 46. The present embodiment also contains a water tank 5 and an electrolytic tank 6. The water tank 5 is piped to the fuel cell 9 for the storage of the water produced by the fuel cell 9. Additionally, the water tank 5 is capable of adjusting the volume of output water flow and overflowing excessive water. The electrolytic tank 6 is connected to the water tank 5 and the fuel cell 9. As such, by computer control, appropriate amount of water is introduced into the electrolytic tank 6 and, by the electricity from the fuel cell 9, the water is electrolyzed into hydrogen and oxygen. The remaining water is recycled back to the water tank 5. On the other hand, the produced hydrogen and oxygen are directed through an exchange membrane 7 so that hydrogen and oxygen are purified and separately delivered to a first pressurizing device 8A and a second pressurizing device 8B. The hydrogen and oxygen are then stored in the hydrogen and oxygen containers 1 and 2 after being pressurized by the first and second pressurizing devices 8A and 8B, respectively.

The exchange membrane 7 is a proton exchange membrane capable of proton conduction capability. In general, chemical groups capable dissociating protons such as the sulfonic acid group, phosphoric acid group, carboxylic acid group, etc., could all be used for proton exchange. In terms of the function and efficiency of proton conduction, polymer electrolyte having sulfonic acid group is a preferable candidate for the proton exchange membrane. Currently the most popular material for the proton exchange membrane is Nafion® from DuPont. Nafion is a fluorocarbon polymer with sulfonic acid group on the side chain for proton conduction. The number of sulfonic acid group is positively related to the proton conduction rate.

The fuel cell 9 is a device converting chemical energy from the fuel burning reaction between hydrogen and oxygen into electrical energy it is capable of continuously producing electricity without the charge/discharge process of conventional secondary batteries. The greatest feature of the fuel cell is that its conversion efficiency is not limited by the Carnot cycle and therefore could be as hid as 60%~80% or two to three times of that of ordinary combustion engine. Additionally, it is versatile, clean, low-noised, friendlier to the environment, reliable, and easy to maintain.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fuel provision system, comprising:
   a hydrogen container for the storage and refill of hydrogen;
   an oxygen container for the storage and refill of oxygen;
   a first pressure adjustment device connected to said hydrogen and oxygen containers for adjusting the pressure and flow of output hydrogen and oxygen from said hydrogen and oxygen containers;
   a second pressure adjustment device connected to said hydrogen and oxygen containers for adjusting the pressure and flow of output hydrogen and oxygen from said hydrogen and oxygen containers;
   a combustion engine connected to said first pressure adjustment device to receive hydrogen and oxygen, said combustion engine being powered by igniting received hydrogen and oxygen;
   a generator connected to and driven by said combustion engine to produce electricity;
   a battery connected to said generator for the storage of electricity produced by said generator;
   a fuel cell connected to said second pressure adjustment device to receive hydrogen and oxygen, and to produce electricity by chemical reaction;
   a water tank connected to said combustion engine and said fuel cell for the storage of water produced by said combustion engine and said fuel cell;
   an electrolytic tank connected to said water tank, said battery, and said fuel cell, said electrolytic tank electrolyzing water from said water tank by electricity from said battery or said fuel cell into hydrogen and oxygen;
   an exchange membrane connected to said electrolytic tank and said water tank, said exchange membrane purifying and separating hydrogen and oxygen from said electrolytic tank, and recycling water back to said water tank;
   a first pressurizing device connected to said exchange membrane and said oxygen container so that separated oxygen is pressurized and stored in said oxygen container; and
   a second pressurizing device connected to said exchange membrane and said hydrogen container so that separated hydrogen is pressurized and stored in said hydrogen container.

2. A fuel provision system, comprising:
   a hydrogen container for the storage and refill of hydrogen;
   an oxygen container for the storage and refill of oxygen;
   a first pressure adjustment device connected to said hydrogen and oxygen containers for adjusting the pressure and flow of output hydrogen and oxygen from said hydrogen and oxygen containers;
   a second pressure adjustment device connected to said hydrogen and oxygen containers for adjusting the pressure and flow of output hydrogen and oxygen from said hydrogen and oxygen containers;
   a fuel tank connected to said first pressure adjustment device to receive hydrogen and oxygen;
   one of a furnace and an industrial cutting/welding device connected to said fuel tank and using said fuel tank's stored hydrogen and oxygen as fuel;
   a fuel cell connected to said second pressure adjustment device to receive hydrogen and oxygen, and to produce electricity by chemical reaction;
   a water tank connected to said fuel cell for the storage of water produced by said fuel cell;

an electrolytic tank connected to said water tank and said fuel cell, said electrolytic tank electrolyzing water from said water tank by electricity from said fuel cell into hydrogen and oxygen;

an exchange membrane connected to said electrolytic tank and said water tank, said exchange membrane purifying and separating hydrogen and oxygen from said electrolytic tank, and recycling water back to said water tank;

a first pressurizing device connected to said exchange membrane and said oxygen container so that separated oxygen is pressurized and stored in said oxygen container; and a second pressurizing device connected to said exchange membrane and said hydrogen container so that separated hydrogen is pressurized and stored in said hydrogen container.

3. A fuel provision system, comprising:

a hydrogen container for the storage and refill of hydrogen;

an oxygen container for the storage and refill of oxygen;

a pressure adjustment device connected to said hydrogen and oxygen containers for adjusting the pressure and flow of output hydrogen and oxygen from said hydrogen and oxygen containers;

a fuel cell connected to said pressure adjustment device to receive hydrogen and oxygen, and to produce electricity by chemical reaction;

an electrothermal device connected to said fuel cell and using electricity produced by said fuel cell as fuel;

a water tank connected to said fuel cell for the storage of water produced by said fuel cell;

an electrolytic tank connected to said water tank and said fuel cell, said electrolytic tank electrolyzing water from said water tank by electricity from said fuel cell into hydrogen and oxygen;

an exchange membrane connected to said electrolytic tank and said water tank, said exchange membrane purifying and separating hydrogen and oxygen from said electrolytic tank, and recycling water back to said water tank;

a first pressurizing device connected to said exchange membrane and said oxygen container so that separated oxygen is pressurized and stored in said oxygen container; and a second pressurizing device connected to said exchange membrane and said hydrogen container so that separated hydrogen is pressurized and stored in said hydrogen container.

* * * * *